United States Patent
Mamidwar et al.

(10) Patent No.: US 9,979,599 B2
(45) Date of Patent: May 22, 2018

(54) DYNAMIC AUDIO/VIDEO CHANNEL BONDING

(71) Applicant: Broadcom Corporation, Irvine, CA (US)

(72) Inventors: Rajesh Shankarrao Mamidwar, San Diego, CA (US); Xuemin Chen, Rancho Santa Fe, CA (US); Victor Hou, San Diego, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 241 days.

(21) Appl. No.: 14/883,075

(22) Filed: Oct. 14, 2015

(65) Prior Publication Data

US 2016/0036660 A1    Feb. 4, 2016

Related U.S. Application Data

(63) Continuation of application No. 13/672,961, filed on Nov. 9, 2012, now Pat. No. 9,185,442.

(Continued)

(51) Int. Cl.
| | |
|---|---|
| *H04L 12/46* | (2006.01) |
| *H04L 12/28* | (2006.01) |
| *H04L 12/24* | (2006.01) |
| *H04L 12/26* | (2006.01) |
| *H04L 5/00* | (2006.01) |

(Continued)

(52) U.S. Cl.
CPC ......... *H04L 41/0896* (2013.01); *H04J 3/062* (2013.01); *H04L 5/0032* (2013.01); *H04L 12/2863* (2013.01); *H04L 12/4633* (2013.01); *H04L 41/0813* (2013.01); *H04L 41/0816* (2013.01); *H04L 41/0866* (2013.01); *H04L 43/04* (2013.01); *H04L 43/0882* (2013.01); *H04N 21/236* (2013.01);
(Continued)

(58) Field of Classification Search
CPC ............. H04L 12/4633; H04L 41/0813; H04L 41/0816; H04L 41/0866; H04L 41/0896; H04L 43/04; H04L 43/0882; H04L 5/0032; H04L 12/26; H04N 21/236; H04N 21/23655; H04N 21/2385; H04N 21/482; H04N 21/60
See application file for complete search history.

(56) References Cited

U.S. PATENT DOCUMENTS

| | | |
|---|---|---|
| 8,516,532 B2 | 8/2013 | Ulm et al. |
| 2006/0130113 A1* | 6/2006 | Carlucci ............ H04N 7/17318 725/118 |

(Continued)

*Primary Examiner* — Ayaz Sheikh
*Assistant Examiner* — Debebe Asefa
(74) *Attorney, Agent, or Firm* — McDermott Will & Emery LLP (57) ABSTRACT

A data communication architecture delivers a wide variety of content, including audio and video content, to consumers. The architecture employs channel bonding to deliver more bandwidth than any single communication channel can carry. In some implementations, the communication architecture communicates content according to an initial bonding configuration. The communication architecture may adjust the bonding configuration to adapt to bonding environment changes affecting the communication capabilities or requirements associated with transmitting the content.

20 Claims, 6 Drawing Sheets

Related U.S. Application Data

(60) Provisional application No. 61/609,339, filed on Mar. 11, 2012, provisional application No. 61/663,878, filed on Jun. 25, 2012.

(51) Int. Cl.
| | |
|---|---|
| *H04J 3/06* | (2006.01) |
| *H04N 21/236* | (2011.01) |
| *H04N 21/2365* | (2011.01) |
| *H04N 21/2385* | (2011.01) |
| *H04N 21/647* | (2011.01) |

(52) U.S. Cl.
CPC ... *H04N 21/2385* (2013.01); *H04N 21/23655* (2013.01); *H04N 21/64738* (2013.01); *Y02D 50/30* (2018.01)

(56) References Cited

U.S. PATENT DOCUMENTS

2011/0035772 A1* 2/2011 Ramsdell ............ H04H 20/103
 725/36
2012/0213259 A1* 8/2012 Renken ............... H04N 7/17309
 375/222

\* cited by examiner

DYNAMIC AUDIO/VIDEO CHANNEL BONDING

1. PRIORITY CLAIM

This application is a continuation application of U.S. application Ser. No. 13/672,961 filed Nov. 9, 2012, now issued as U.S. Pat. No. 9,185,442, which claims the priority to U.S. Provisional Application Ser. No. 61/663,878 filed Jun. 25, 2012 and U.S. Provisional Application Ser. No. 61/609,339 filed Mar. 11, 2012, each of which being incorporated by reference in its entirety.

2. TECHNICAL FIELD

This disclosure relates to audio and video communication techniques. In particular, this disclosure relates to dynamic channel bonding for audio and video communication.

3. BACKGROUND

Rapid advances in electronics and communication technologies, driven by immense private and public sector demand, have resulted in the widespread adoption of smart phones, personal computers, internet ready televisions and media players, and many other devices in every part of society, whether in homes, in business, or in government. These devices have the potential to consume significant amounts of audio and video content. At the same time, data networks have been developed that attempt to deliver the content to the devices in many different ways. Further improvements in the delivery of content to the devices will help continue to drive demand for not only the devices, but for the content delivery services that feed the devices.

BRIEF DESCRIPTION OF THE DRAWINGS

The innovation may be better understood with reference to the following drawings and description. In the figures, like reference numerals designate corresponding parts throughout the different views.

DETAILED DESCRIPTION

Figure 1:
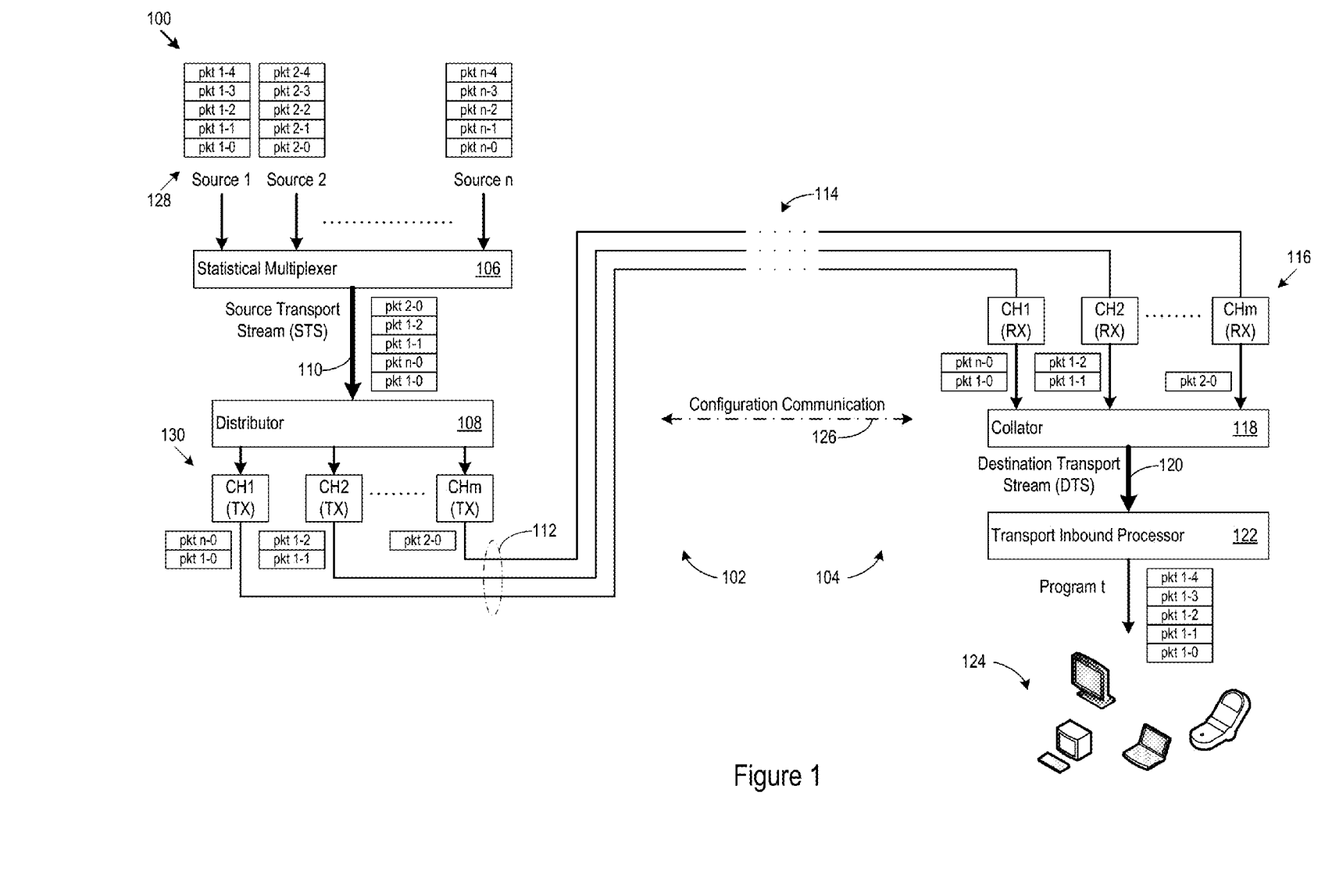
FIG. 1 shows an example of a content delivery architecture that employs channel bonding.

FIG. 1 shows an example content delivery architecture 100. The architecture 100 delivers data (e.g., audio streams and video programs) from a source 102 to a destination 104. The source 102 may include satellite, cable, or other media providers, and may represent, for example, a head-end distribution center that delivers content to consumers. The source 102 may receive the data in the form of Motion Picture Expert Group 2 (MPEG2) Transport Stream (TS) packets 128, when the data is audio/visual programming, for example. The destination 104 may be a home, business, or other location, where, for example, a set top box processes the data sent by and received from the source 102. The discussion below makes reference to packets, and in some places specific mention is made of MPEG2 TS packets. However, the channel bonding techniques described below may be applied to a wide range of different types and formats of data and communication units, whether they are MPEG2 TS packets, packets of other types, or other types of communication units, and the techniques are not limited to MPEG2 TS packets at any stage of the processing.

The source 102 may include a statistical multiplexer 106 and a distributor 108. The statistical multiplexer 106 helps make data transmission efficient by reducing idle time in the source transport stream (STS) 110. In that regard, the statistical multiplexer 106 may interleave data from multiple input sources together to form the transport stream 110. For example, the statistical multiplexer 106 may allocate additional STS 110 bandwidth among high bit rate program channels and relatively less bandwidth among low bit rate program channels to provide the bandwidth needed to convey widely varying types of content at varying bit rates to the destination 104 at any desired quality level. Thus, the statistical multiplexer 106 very flexibly divides the bandwidth of the STS 110 among any number of input sources.

Several input sources are present in FIG. 1: Source 1, Source 2, . . . , Source n. There may be any number of such input sources carrying any type of audio, video, or other type of data (e.g., web pages or file transfer data). Specific examples of source data include MPEG or MPEG2 TS packets for digital television (e.g., individual television programs or stations), and 4 K×2 K High Efficiency Video Coding (HEVC) video (e.g., H.265/MPEG-H) data, but the input sources may provide any type of input data. The source data (e.g., the MPEG 2 packets) may include program identifiers (PIDs) that indicate a specific program (e.g., which television station) to which the data in the packets belongs.

The STS 110 may have a data rate that exceeds the transport capability of any one or more communication links between the source 102 and the destination 104. For example, the STS 110 data rate may exceed the data rate supported by a particular cable communication channel exiting the source 102. To help deliver the aggregate bandwidth of the STS 110 to the destination 104, the source 102 includes a distributor 108 and modulators 130 that feed a bonded channel group 112 of multiple individual communication channels. In other words, the source 102 distributes the aggregate bandwidth of the STS 110 across multiple outgoing communication channels that form a bonded channel group 112, and that together provide the bandwidth for communicating the data in the STS 110 to the destination 104.

The distributor 108 may be implemented in hardware, software, or both. The distributor 108 may determine which data in the STS 110 to send on which communication channel. As one example, the distributor 108 may divide the STS 110 into chunks of one or more packets. The chunks may vary in size over time, based on the communication channel that will carry the chunk, the program content in the chunk, or based on any other desired chunk decision factors implemented in the distributor 108. The distributor 108 may forward any particular chunk to the modulator for the channel that the distributor 108 has decided will convey that particular chunk to the destination 104.

In that regard, the multiple individual communication channels within the bonded channel group 112 provide an aggregate amount of bandwidth, which may be less than, equal to, or in excess of the aggregate bandwidth of the STS 110. As just one example, there may be three 30 Mbs physical cable channels running from the source 102 to the destination 104 that handle, in the aggregate, up to 90 Mbs. The communication channels in the bonded channel group 112 may be any type of communication channel, including dial-up (e.g., 56 Kbps) channels, ADSL or ADSL 2 channels, coaxial cable channels, wireless channels such as 802.11a/b/g/n channels or 60 GHz WiGig channels, Cable TV channels, coaxial channels, WiMAX/IEEE 802.16 channels, Fiber optic, 10 Base T, 100 Base T, 1000 Base T, power lines, satellite, or other types of communication channels. The modulators 130 may process data for communication across any type of communication channel, including the examples listed above.

The bonded channel group 112 travels to the destination 104 over any number of transport mechanisms 114 suitable for the communication channels within the bonded channel group 112. The transport mechanisms 144 may include physical cabling (e.g., fiber optic or cable TV cabling), wireless connections (e.g., satellite, microwave connections, 802.11a/b/g/n connections), or any combination of such connections.

At the destination 104, the bonded channel group 112 is input into individual channel demodulators 116. The channel demodulators 116 recover the data sent by the source 102 in each communication channel. A collator 118 collects the data recovered by the demodulators 116, and may create a destination transport stream (DTS) 120. The DTS 120 may be one or more streams of packets recovered from the individual communication channels as sequenced by the collator 118.

The destination 104 also includes a transport inbound processor (TIP) 122. The TIP 122 processes the DTS 120. The TIP 122 may execute program identifier (PID) filtering for each channel independently of other channels. To that end, the TIP 122 may identify, select, and output packets from a selected program (e.g., a selected program 't') that are present in the DTS 120, and drop or discard packets for other programs. In the example shown in FIG. 1, the TIP 122 has recovered program 't', which corresponds to the program originally provided by Source 1. The TIP 122 provides the recovered program to any desired endpoints 124, such as televisions, laptops, mobile phones, and personal computers. The destination 104 may be a set top box, for example, and some or all of the demodulators 116, collator 118, and TIP 122 may be implemented as hardware, software, or both in the set top box. In this way, the content delivery architecture 100 may employ channel bonding to deliver data from the source 102 to the destination 104.

The source 102 may deliver data to the destination 104 according to a bonding configuration. A bonding configuration may include any number of bonding configuration parameters that specify how the source 102 delivers the data to the destination 104. As examples, the bonding configuration may specify the number of communication channels in the bonded channel group 112, the communication channels that may be included in the bonded channel group 112, the type of communication channels that may be included in the bonding channel group 112, the program sources eligible for bonding, when and for how long communication channels and program sources are available for channel bonding, bonding adaptation criteria, transmission parameters, and any other parameters that may influence how and when the distributor 108 pushes program data across the communication channels in the bonded channel group 112.

As discussed in greater detail below, the distributor 108 may adapt the bonding configuration used to deliver data to the destination 104. As part of the bonding adaptation process, the distributor 108 may monitor any number of bonding environment characteristics associated with communicating the data to the destination 104. For example, the distributor 108 may monitor data characteristics associated with packet data carried by the STS 110 or by any number of data sources 128, transmission characteristics associated with communication resources of the source 102, destination characteristics associated with destination 104, channel characteristics such as channel conditions or performance, or others. Upon identifying a change in on or more of the monitored characteristics, the distributor 108 may determine a configuration change to the bonding configuration. The configuration change may alter any number of bonding configuration parameters to adapt to a changed data characteristic, transmission characteristic, destination characteristic, or other bonding environment characteristic associated with delivering the data from the source 102 to the destination 104. The distributor 108 may alter the bonding configuration according to the configuration change, resulting in an adjusted bonding configuration. Then, the distributor 108 may distribute a subsequent portion of data, e.g., the next packets in the STS 110 pending delivery, for eventual transmission to the destination 104.

Before, during, or after the bonding adaptation process, the source 102 and the destination 104 may exchange configuration communications 126. The configuration communications 126 may travel over an out-of-band or in-band channel between the source 102 and the destination 104, for example in the same or a similar way as program channel guide information, and using any of the communication channel types identified above.

One example of a configuration communication is a message from the source 102 to the destination 104 that conveys the parameters of the bonded channel group 112 to the destination 104. More specifically, the configuration communication 126 may specify the number of communication channels bonded together; identifiers of the bonded communication channels; the types of programs that the bonded communication channels will carry; marker packet format; chunk, program packet, or marker packet size; chunk, program packet, or marker packet PID or sequence number information, or any other chunk or bonding configuration information that facilitates processing of the bonded channel group 112 at the destination 104. The configuration communication 126 may specify bonding configuration parameters initially employed to communicate the data, adapted bonding configuration parameters, or both.

One example of a configuration communication message from the destination 104 to the source 102 is a configuration communication that specifies the number of communication channels that the destination 104 may process as eligible bonded channels; identifiers of the eligible bonded channels; status information concerning status of the demodulators 116, e.g., that a demodulator is not functioning and that its corresponding communication channel should not be included in a bonded channel group; channel conditions that affect bit rate or bandwidth; or any other information that the source 102 and the distributor 108 may consider that affects processing of the data from the sources into a bonded channel group.

Figure 2:
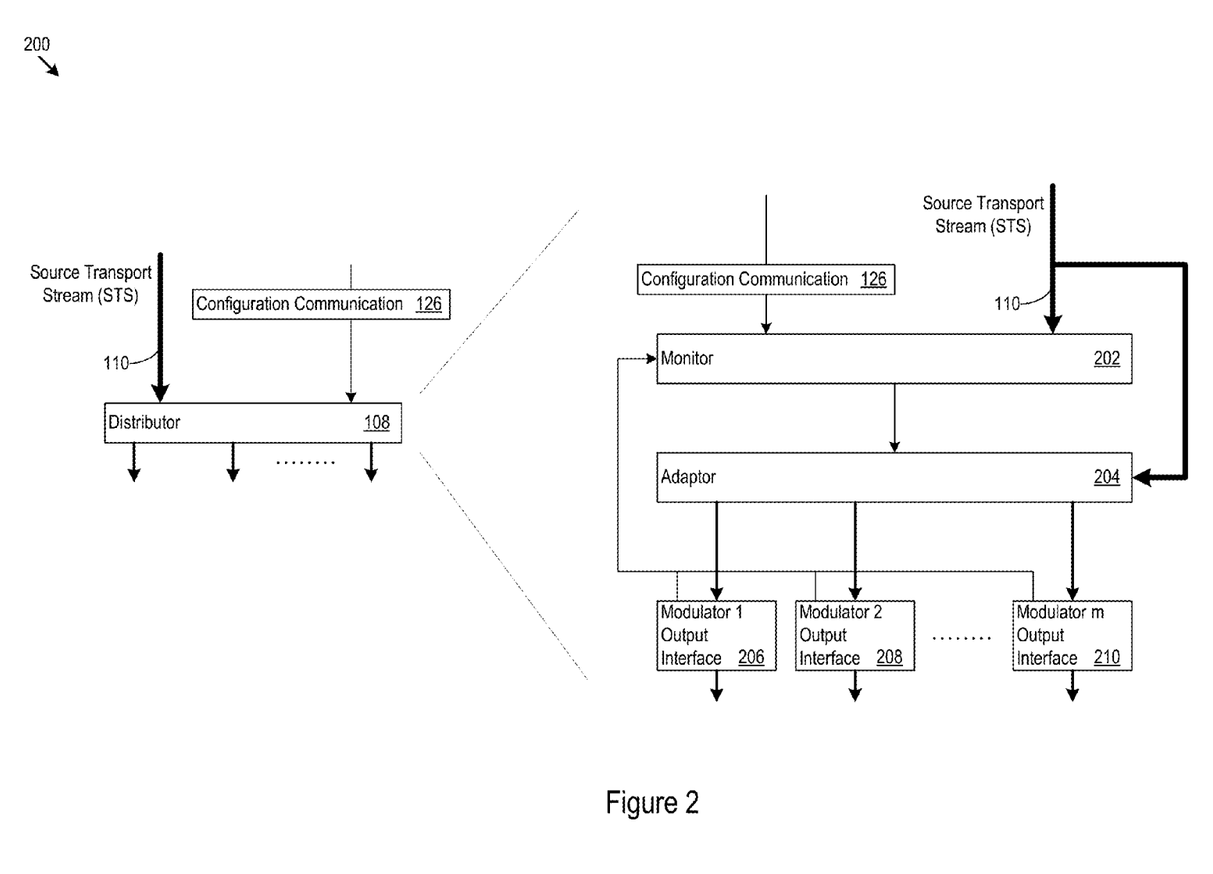
FIG. 2 shows an example implementation of a distributor.

FIG. 2 shows an example implementation 200 of a distributor 108. The distributor 108 includes a monitor 202 and an adaptor 204. In addition, the distributor 108 includes modulator output interfaces, such as those labeled as 206, 208, and 210.

The monitor 202 may be implemented as hardware, software, or both. The monitor 202 may monitor any number of bonded environment characteristics before, during, or after the delivery of a data communication from the source 102 to the destination 104. The monitor 102 may receive monitoring data from any number of sources to identify changes to the bonded environment occurring during the data communication. As examples, the monitor 202 shown in FIG. 2 receives the STS 110 and the configuration communication 126. The monitor 202 also communicates with the modulator output interfaces 206-210 as well, through which the monitor 202 may receive communication channel data indicative of channel conditions, reliability, power consumption, transmission parameters, or other transmission characteristics associated with one or more of the modulators 130 that currently drive a communication channel of the bonded channel group 112. The monitor 202 may receive communication channel data from modulators 130 corresponding to communication channels outside the bonded channel group 112 as well. As discussed in greater detail below, the monitor 202 may analyze the received monitoring data to possibly determine a configuration change. The monitor 202 may send the determined configuration change to the adaptor 204.

The adaptor 204 may be implemented as hardware, software, or both. The adaptor 204 may determine which data in the STS 110 to send on which communication channel. In that regard, the adaptor 204 may distribute data from the STS 110 to any number of modulator output interfaces, e.g., by sending chunks of one or more packets through a corresponding modulator output interface. The adaptor 204 may distribute packet data of the STS 110 according to a bonding configuration. As discussed in greater detail below, the adaptor 204 may adjust an initial bonding configuration used to send the STS 110 packet data in response to changes in the bonded environment, e.g., in response to receiving a configuration change from the monitor 202. The adaptor may determine an adjusted bonding configuration for delivering the source data, and the adaptor 204 may distribute subsequent packet data of the STS 110 according to an adjusted bonding configuration. The adjusted bonding configuration may additionally or alternatively alter a communication parameter of any number of communication resources of the source 102, such as the modulators 130, the statistical multiplexer 106, or others. The adjusted bonding configuration may also alter communication parameters of communication resources of the destination 104 too.

Figure 3:
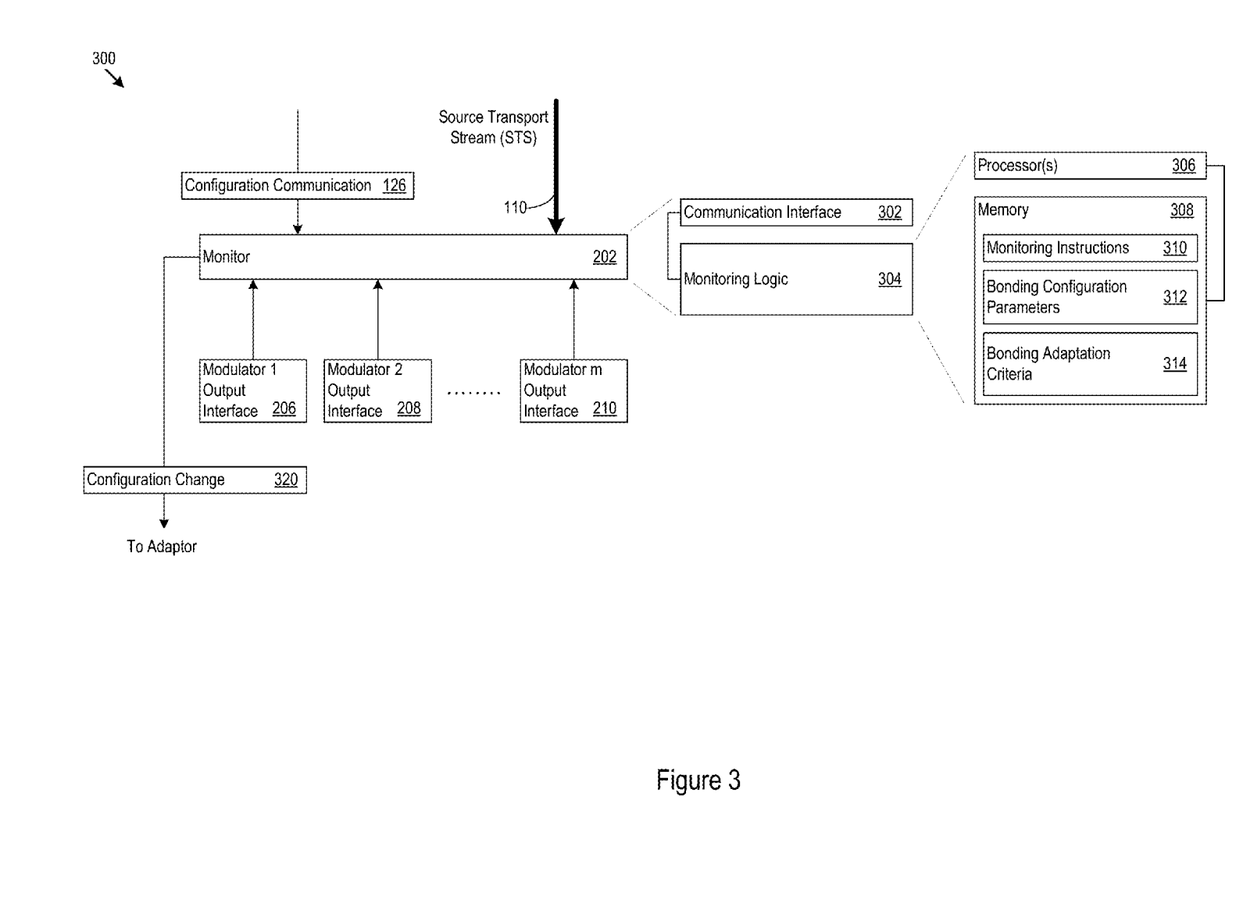
FIG. 3 shows an example implementation of a portion of a distributor.

FIG. 3 shows an example implementation of a portion 300 of a distributor 108. The portion 300 shown in FIG. 3 may implement monitoring functionality in the distributor 108, and includes the monitor 202 and modulator interfaces 206-210 discussed above. The monitor 202 includes a communication interface 302 and monitoring logic 304. The communication interface 302 may receive data from various sources, including sources internal and external to the source 102. The communication interface 302 may include a high bandwidth (e.g., optical fiber) interface to receive the STS 110. The communication interface 302 may also receive a configuration communication 126 from the destination 104, e.g., through a sideband or in-band communication channel between the source 102 and the destination 104. The monitor 202 may receive monitoring data indicative of transmission characteristics or parameters associated with any communication channel connecting the source 102 and destination 104, which the monitor 202 may receive directly from modulator output interfaces or through the communication interface 302.

The monitor 202 also communicates with the adaptor 204, for instance by sending a configuration change message 320 indicative of a configuration change determined by the monitoring logic 304. The configuration change message 320 may specify a particular bonding environment characteristic change, such one or more of the characteristic changes identified by the monitor 202. In this example, and as described in greater detail below with respect to FIGS. 5 and 6, the adaptor 204 may use the specified characteristic change to accordingly adjust the bonding configuration, such as by modifying the bonding configuration parameters 312. As a variation, the configuration change message 320 may directly specify one or more changes to the bonding configuration parameters 312.

The monitoring logic 304 implements as hardware, software, or both, any of the logic described in connection with the operation of the monitor 202 or any other portion or functionality of the distributor 108. As one example, the monitoring logic 304 may include one or more processors 306 and program and data memories 308. The program and data memories 308 hold, for example, monitoring instructions 310, bonding configuration parameters 312, and bonding adaptation criteria 314. The processors 306 execute the monitoring instructions 310 to monitor and analyze bonding environment characteristics associated with a data communication to the destination 104; to determine whether a configuration change is warranted; and to determine the content of the configuration change. The bonding configuration parameters 312 inform the processors 306 as to the current bonding configuration employed by content delivery architecture 100, including the distributor 108. The bonding adaptation criteria 314 specify conditions and other criteria the processors 306 use to determine whether a configuration change is warranted and/or content of the configuration change. In determining the configuration change, the monitoring logic 304 may take into account various factors, including any combination of the monitoring data, an analysis of the monitoring data, identified changes in the bonding environment, the current bonding configuration parameters 312, and the bonding adaptation criteria 314.

The monitor 202 monitors any number of parameters, conditions, traits, attributes, or other bonding environment characteristics associated with the source 102, destination 104, the data communication, intermediate network nodes, or any aspects relating to the bonded environment. The monitor 202 may monitor these environment characteristics in several ways. For instance, the monitor 202 may monitor a characteristic periodically, e.g., at a periodic rate specified by a configurable period parameter, aperiodically, in response to a user request, upon receiving a configuration communication 126, by measuring environment characteristic values, e.g., a channel condition value of a communication channel, or any combination thereof. In monitoring the bonded environment characteristics, the monitor 202 identifies changes in one or more of the monitored characteristics and determines whether a configuration change is warranted. In one variation, the monitor 202 may determine a configuration change when one or more characteristic changes satisfy the bonding adaptation criteria 314. The monitor 202 may monitor—e.g., measure, observe and/or analyze, any combination of the bonded environment characteristics, including any combination of the exemplary characteristics presented next.

The monitor 202 may monitor data characteristics of the bonded environment. Data characteristics may refer to any attribute, requirement, or transmission parameter associated with the data sent by the source 102 to the destination 104. In that regard, the monitor 202 may receive and analyze the STS 110, data from one or more individual data sources 130, or both. In one variation, the monitor 202 may filter the STS 110 to analyze a subset of the STS 110, e.g., a particular program in the STS 110 or a portion of the STS 110 originating from a selected data source among the data sources 130. To monitor the data, the monitor 202 may examine the packet content of any number of packets in the monitored data, e.g., examining packet headers, tags, payload, etc. The monitor 202 may identify, with respect to the monitored data, any change in data type, specified communication path, communication requirement or other attribute associated with the monitored data. A communication requirement of the monitored data may specify a particular bit-rate, priority, Quality-of-Service (QoS), reliability, or other parameter specifying a communication characteristic of the data.

The monitor 202 may determine a configuration change when a monitored data characteristic changes. For example, the bonding adaptation criteria 314 may be satisfied when the monitor 202 identifies a change in data type and/or transmission priority of data, e.g., the STS 110, being delivered to the destination 104. The monitor 202 may also determine a configuration change when a monitored data characteristic changes beyond a specified amount, such as predetermined threshold specified by the bonding adaptation criteria 314. The bonding adaptation criteria 314 may specifically indicate which data characteristic changes warrant a configuration change based on exceeding a predetermined threshold parameter. In that regard, the bonding adaptation criteria 314 may include specific threshold parameters for changes to selected data characteristics, e.g., specific thresholds for changes to latency, bandwidth, QoS, or other communication characteristics of packet data in the STS 110.

In one instance, the monitor 202 may determine a data characteristic change by identifying a QoS characteristic change that occurs in the monitored data. For example, the monitor 202 may identify an increase in the number or proportion of packets in the STS 110 requiring an elevated QoS. The current bonding configuration may specify insufficient communication resources, e.g., communication channels, to satisfy the QoS requirement of particular packet data in the STS 110. Conversely, as the STS 110 is delivered to the destination 104 and the STS 110 content changes, the STS 110 may proportionally or aggregately decrease in required QoS. In such a case, the bonding configuration may result in a surplus of communication resources transmitting the source data at a higher QoS than required by the packet data. When changes in QoS of the STS 110 occur, the monitor 202 may determine a configuration change as specified by the bonding adaptation criteria 314.

The monitor 202 may determine a configuration change that correlates with an identified data characteristic change. As one illustrative example, when the monitor 202 determines the data type of the STS 110 changes from an High-Definition (HD) video stream to a Non-HD video stream, the configuration change may specify adjusting the bonding configuration of the bonded channel group 112 accordingly—e.g., by adjusting aggregate or individual bandwidth by a particular amount, adjusting the QoS capability by a particular amount, or adjusting other aggregate communication capabilities of the bonded channel group 112, such as bit-rate, latency, chunk size, security, or other characteristics of the bonded channel group 112. Thus, the monitor 202 may monitor data characteristics of the data content delivered to the destination 104.

As another exemplary characteristic, the monitor 202 may monitor bandwidth availability. The monitor 202 may monitor the bandwidth availability of any number of communication channels in the content delivery architecture 100, including the bandwidth availability of one, some, or all of the communication channels in a current bonded channel group 112, as specified by a current bonding configuration. The monitor 202 may also observe bandwidth availability of communication channels not part of the current bonded channel group 112—e.g., communication channels not being used by the distributor 108 to send the STS 110 to destination 104. In one implementation, the monitor 202 periodically retrieves bandwidth availability indications from one or more eligible communication channels though the respective modulator output interfaces associated with the eligible communication channels. The bandwidth availability indication may identify any combination of the total throughput of a particular communication channel, used throughput, or available throughput (e.g., unused throughput).

The monitor 202 may also identify changes in bandwidth availability when one or more communication channels become available, unavailable, or a mix of both. This scenario may occur, for instance, when an additional communication channel is activated, connected, or otherwise made available on the source 102, destination 104, or both. Similarly, the monitor 202 may identify a bandwidth availability change through a channel availability change when a communication channel is deactivated, disconnected, or otherwise made unavailable by the source 102, destination 104, or both. The monitor 102 may identify channel availability changes among communication channels within and/or outside the bonded channel group 112. As another example, communication channels outside the bonded channel group 112 may become available as the source 102 or destination 104 complete separate communications directed to other devices. In this case, the monitor 202 may identify a change in bandwidth availability when the previously used communication channels become available for use. The monitor 202 may identify channel availability changes that occur in the destination 104 or an intermediate node via a received configuration communication 126 indicating an additional eligible communication channel.

In response to identifying a bandwidth availability change, the monitor 202 may determine a configuration change to a bonding configuration employed by the content delivery architecture 100. The bonding adaptation criteria 314 may be satisfied when an identified bandwidth availability change exceeds a predetermined bandwidth threshold, which may vary according to particular communication channels, types of communication channels, groupings of communication channels, etc. The configuration change determined by the monitor 202 may directly or indirectly correlate with the bandwidth availability change, e.g., the configuration change specifies increasing or decreasing the aggregate bandwidth of the bonded channel group 112 in a proportional or equal amount as the bandwidth availability change.

Continuing the listing of exemplary characteristics, the monitor 202 may identify changes in demand. Demand changes may refer to any change that affects the required bit rate to communicate the source data to the destination 104. As an example, a demand decrease may occur when the STS 110 changes from carrying an HD video stream to a non-HD video stream. Along similar lines, a demand increase may occur when the STS 110 changes from carrying a non-HD audio stream to an HD audio stream. Demand changes may result according to the amount of video data present at various points of a video stream, e.g., an intense action scene of an video broadcast may result in packet data carrying greater amounts of video data than, for example, a prolonged still sequence in a video stream. The monitor 202 may determine demand changes by inspecting content of data transmitted from the source 102, e.g., the STS 110. In this respect, the monitoring and analysis of demand characteristics and changes thereto may share similarities with the monitoring and analysis of data characteristics described above.

The monitor 202 may also monitor a power characteristic, which may refer to any power-related characteristic associated with the source 102, destination 104, or both. Power characteristics include, as examples, total power consumption, power consumption rate, and power availability. The monitor 202 may identify changes in the power consumption rate for one or more communication channels within the bonded channel group 112, outside the bonded channel group 112, or both. The monitor 202 may also identify power availability changes, which may occur through the changing of one or more power sources supplying the source 102. Power availability in the source 102 may fluctuate when the source 102 transitions from receiving power through an external or permanent power source, e.g., plugged in through a power outlet, to an internal or temporary power source, e.g., battery. A similar power availability change may also occur in the destination 104 or any intermediate network node, which the monitor 202 may identify through a received configuration communication 126 or through other messaging. The monitor 202 may determine a configuration change when a power characteristic changes or changes beyond a predetermined power threshold. The determined configuration change may specify the identified power characteristic change.

Continuing, the monitor 202 may monitor any number of channel characteristics. One exemplary group of channel characteristics includes channel condition characteristics of any communication channel accessible by the source 102, destination 104, or any other intermediate network node. The monitor 202 may observe channel characteristics indicative of throughput, latency, efficiency, QoS capability, reliability, or other channel indicia. For example, the monitor 202 may obtain a Signal-to-Noise Ratio (SNR), signal strength, background noise level, radio coverage (e.g., for wireless connections), channel capacity, or any other performance or quality metrics for any of the monitored communication channels to detect changes to the bonded environment.

The monitored channel characteristics may also include path or link cost for communicating across one or more particular communication channels within the bonded channel group 112, among eligible communication channels in the source 102, the destination 104 or intermediate network nodes, or any combination thereof. Link cost or past cost may refer to any number of route characteristics associated with communicating data through a particular communication channel or group of communication channels. Link cost determination may take into account delay, distance, throughput, error rate, monetary cost, number of hops, link failures, or other factors. The monitor 202 may determine link costs in various ways, including according to any known routing algorithms. As such, the monitor 202 may identify changes in the link cost for communication across a particular communication channel, either within or outside the bonded channel group 112. The monitor 202 may identify channel characteristic changes and, in response, determine a configuration change that specifies the particular channel characteristic changes identified by the monitor 202.

The monitor 202 may also monitor channel availability, which may be identified in any of the ways as described above with respect to monitoring bandwidth availability. The monitor 202 may determine a configuration change when a newly available communication channel differs in transmission characteristics from one or more communication channels in the bonded channel group 112, e.g., according to channel capacity, available bandwidth, QoS, latency, reliability, quality, cost, or any other parameter or trait discussed above. When identifying a channel availability change, the monitor 202 may determine a configuration change, which the monitor 202 may communicate as a configuration change message 320 to the adaptor 204. The monitor 202 may also determine a configuration change when one or more communication channels within the bonded channel group 112 become unavailable, e.g., through a hardware failure. In such a case, the configuration change may specify removing the unavailable communication channel from the bonded channel group 112 and/or configuration adjustments to compensate for the unavailable communication channel, e.g., increased bandwidth, additional QoS, bit-rate, etc., to compensate for the removed communication channel.

The monitor 202 may monitor any combination of the exemplary characteristics described above as well as any other communication or environment characteristic associated with the bonded communication environment. The bonding adaptation criteria 314 may include one or more criterion for any particular monitored characteristic, which may be satisfied when the monitor 202 identifies a characteristic change and/or a characteristic change exceeding a predetermined threshold, thereby resulting in a configuration change to the bonding configuration. The monitor 202 may then communicate the configuration change to the adaptor 204, e.g., as a configuration change message 320.

The monitor 202 may additionally or alternatively determine a configuration change in response to obtaining a configuration change request. The configuration change request may be implemented as a message sent by other logic in the source 102 or an external source, e.g., the destination 104. To illustrate, the destination 104 may send a configuration communication 126 requesting, as an example, increased bandwidth for content delivered to the destination 104. As another example, a network provider operating the source 102 may instruct the source 102 to provide increased service—e.g., increased bandwidth, reliability, QoS, or an increase in any other communication quality or performance metric—for a particular service group, user, customer, data type, data originating from a particular data source 130, period of time, geographical zone, specific broadcast or program, communication session, or other segment. In one variation, a user may request additional bandwidth for a particular program, time slot, or session by paying an additional service fee. The network operator or service provider may then request a configuration change to accommodate the user's increase service request (e.g., a pay-per-bond option). As another example with respect to the configuration change request, the destination 104 or external logic may send a configuration change request that elevates the priority of a particular data type, data set, or other data segment.

In response to receiving a configuration change request, the monitor 202 may determine a configuration change indicative of the requested change. The monitor 202 may then communicate the configuration change to the adaptor 204, e.g., as a configuration change message 320.

Figure 4:
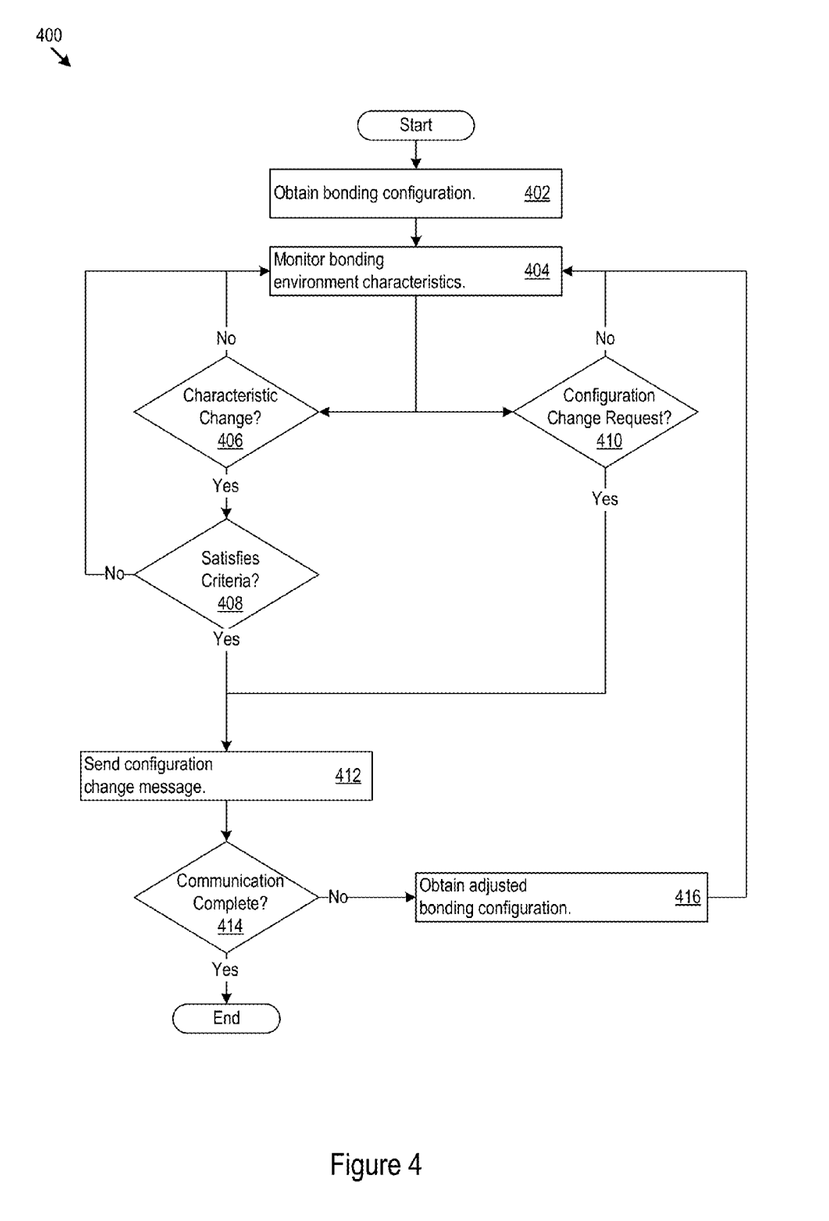
FIG. 4 shows an example of logic for monitoring content delivery conditions.

FIG. 4 shows an example of logic 400 for monitoring content delivery conditions. The logic 400 may be implemented as hardware, software, or both. For example, the monitoring logic 304 may implement the logic 400 in software as the monitoring instructions 310.

The monitoring logic 304 may obtain a current bonding configuration (402) that the source 102 employs to communicate source data to the destination 104 or an intermediate network node. For instance, the monitoring logic 304 may access bonding configuration parameters 312 specifying the current bonding configuration. While the source 102 communicates the source data, the monitoring logic 304 may monitor any number of bonding environment characteristics (404), including any of the exemplary characteristics discussed above. The monitoring logic 304 may monitor the environment characteristics periodically, upon user request, or at any other rate or frequency. The monitoring logic may also monitor bonding environment characteristics by receiving content data (e.g., the STS 110), environment data (e.g., a measured channel condition through a modulator output interface), or other data (e.g., a configuration communication 126 from the destination 104 or other intermediate network node).

Upon identifying a characteristic change (406), the monitoring logic 304 may determine whether characteristic change satisfies the bonding adaptation criteria 314 (408). Such a determination may also take into account the current bonding configuration. When the monitoring logic 304 does not identify a characteristic change or when an identified characteristic change does not satisfy the bonding adaptation criteria 314, the monitoring logic 304 may continue to monitor the bonding environment characteristics. When one or more identified characteristic changes satisfy the bonding adaptation criteria 314, the monitoring logic 304 may determine a configuration change based on the characteristic changes. The monitoring logic may also identify a configuration change in response to receiving a configuration change request (410), as described above.

In one implementation, the configuration change specifies the one or more characteristic changes that satisfy the bonding adaptation criteria 314. The configuration change may additionally or alternatively specify the particular configuration change request received by the monitoring logic 304. The monitoring logic 304 then sends a configuration change message 320 to additional logic (e.g., the adaptor 204) to adapt the bonding configuration based on these characteristic changes and/or configuration change requests (412). Until the source 102 stops sending source data to the destination 104 (414), the monitoring logic 304 may obtain an adjusted bonding configuration (416) and continue the monitoring process.

Figure 5:
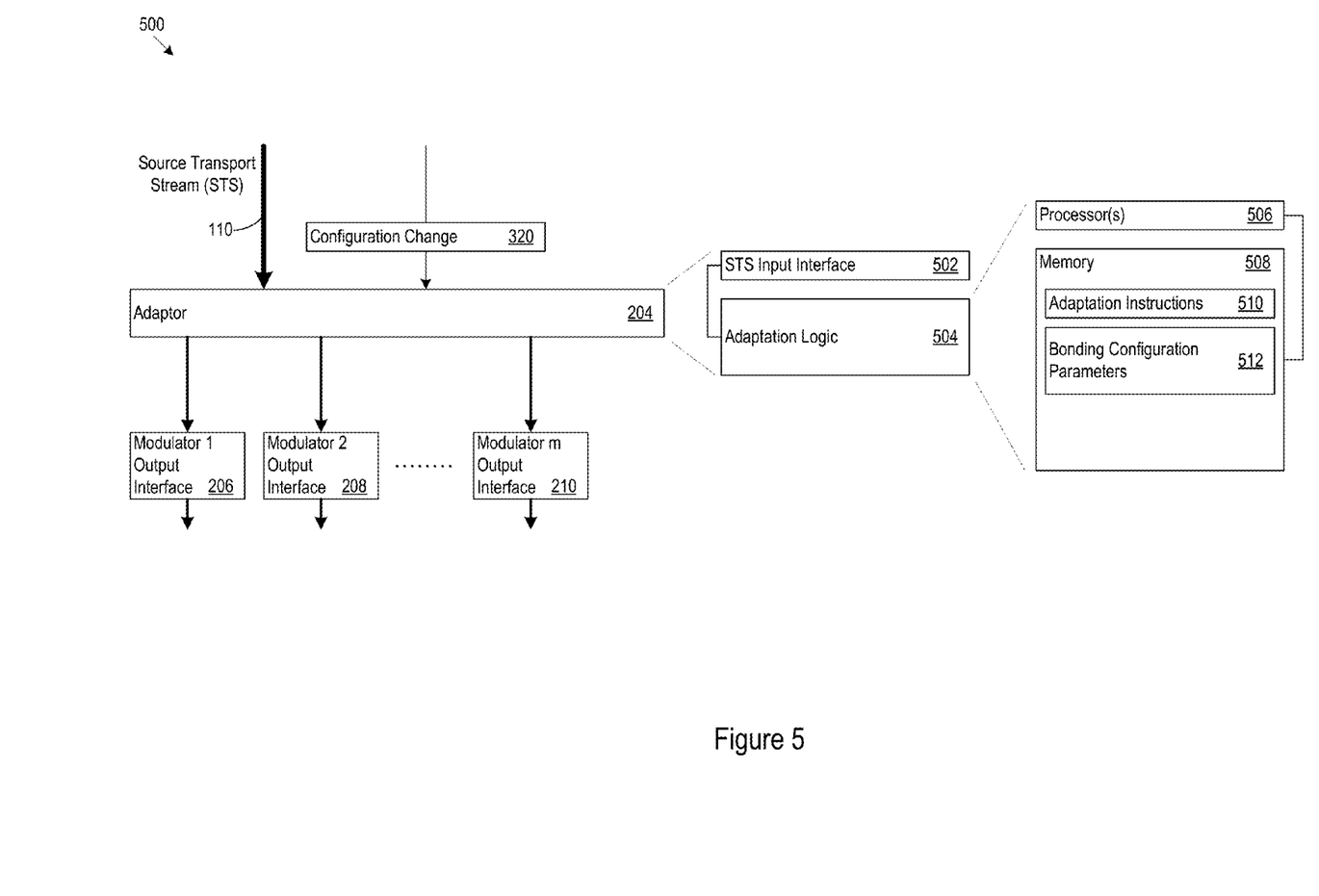
FIG. 5 shows an example implementation of a portion of a distributor.

FIG. 5 shows an example implementation of a portion 500 of a distributor 108. The portion 500 shown in FIG. 5 may implement bonding configuration adaptation functionality in the distributor 108, and includes the adaptor 204 and modulator interfaces 206-210 discussed above. The adaptor 202 includes a STS input interface 502 and adaptation logic 504. The STS input interface 502 may include a high bandwidth (e.g., optical fiber) interface to receive the STS 110. The adaptor 204 may also receive a communication change message 320 from the monitor 202 in various ways, e.g., through a communication interface with the monitor 202, by accessing a shared memory location, or in other ways. The communication change message 320 may indicate one or more bonding environment characteristic changes identified by the monitor 202 or a configuration change request.

The adaptation logic 504 implements as hardware, software, or both, any of the logic described in connection operation of the adaptor 204 or any other portion or functionality of the distributor 108, including distributing the STS 110 as packet data across different communication channels in a bonded channel group 112. As one example, the adaptation logic 504 may include one or more processors 506 and program and data memories 508. The program and data memories 508 hold, for example, adaptation instructions 510 and bonding configuration parameters 512. The monitor 202 described above and the adaptor 204 may share common circuitry, including as examples processors and memories. In that regard, the monitor 202 and adaptor 204 may access a common set of bonding configuration parameters 512 such that bonding configuration adjustments reflected in the bonding configuration parameters 512 may be accessible by the monitor 202, adaptor 204, or both.

The processors 506 execute the adaptation instructions 510 to receive the configuration change message 320 and in response, determine and apply modifications to a bonding configuration. The processors 506 obtain an adjusted bonding configuration, which may be used to update the bonding configuration parameters 512. Then, the processors 506 or another portion of the distributor 108 may distribute subsequent source data, e.g., next packet or group of packets in the STS 110, according to the adjusted bonding configuration.

In operation, the adaptor 204 may adjust the bonding configuration in any number of ways to effectuate a configuration change specified by the configuration change message 320. Exemplary modifications to the bonding configuration that the adaptor 204 may implement are presented next. The adaptor 204 may implement an adjusted bonding configuration by updating the bonding configuration parameters 512, sending parameter change indications to communication resources in the source 102 (e.g., through the modulator output interfaces), or sending a configuration communication 126 to the destination 104 specifying the adjusted bonding configuration, changes to the previous bonding configuration, or both.

As one exemplary adjustment, the adaptor 104 may adjust the bonded channel group 112. In that regard, the adaptor may add one or more available communication channels to the bonded channel group 112, remove one or more communication channels from the bonded channel group 112, or both. Bonded channel group adjustments may be made with respect to a type of communication channel—e.g., by removing one or more channels of a particular type or by replacing communication channels of a first channel type with communication channels of a second channel type. The adaptor 104 may determine an adjusted bonding configuration that results in uneven bonding group sizes for channels of different types. The adjusted bonding configuration may also result in changes to the number types of communication channels in the bonded channel group, such as by adding a new type of communication channel to the bonded channel group 112 or removing all communication channels of a particular channel type from the bonded channel group 112.

The adaptor 204 may adjust the bonded channel group 112 in response to any number of configuration changes identified by the monitor 204. First, the adaptor 204 may adjust a bonding configuration to add an additional communication channel to the bonded channel group 112 in response to various configuration changes. For instance, the adaptor 204 may adjust the bonded configuration to add an additional communication channel in response to a configuration change specifying an increased demand, increased (e.g., shorter) latency requirement, increased bandwidth requirement, increased bandwidth request (e.g., as specified by a configuration change request from a network operator, the destination 104, a user, or others), increased data priority, increased power availability, or other configuration changes or requests. Conversely, the adaptor 204 may adjust the bonded configuration to remove a communication channel from the bonded group 112 in response to various configuration changes well. Such configuration changes may include decreased demand, decreased (e.g., longer) latency requirement, decreased bandwidth requirement, decreased bandwidth request, a decreased data priority, decreased power availability, or other changes and requests. As a further example, the adaptor 204 may add or remove a communication channel from the bonded channel group 112 to adjust the aggregate bandwidth of the bonded channel group 112 according to a configuration change.

In another variation, the adaptor 204 may adjust the bonded channel group 112 by adding one or more available communication channels while also removing one or more communication channels. This adjusted bonding configuration may occur when one or more available communication channels have increased transmission capability as compared to one or communication channels in the bonded channel group 112. As one illustrative example, the adaptor 204 may receive a configuration change message 320 indicating the activation of an unused 30 Mbps cable channel, which communicate data at a higher bandwidth, quality, and reliability, than two 802.11 wireless channels currently part of the bonded channel group 112 and performing at 10 Mbps. The adaptor 204 may adjust the bonding configuration to remove the two 802.11 wireless channels while adding the newly available cable channel. In this way, the adaptor 204 may at least maintain (and in this example, increase) the aggregate bandwidth of the bonded channel group 112 while increasing the quality and reliability capability of the bonded channel group. As another example, the adaptor 204 may subsequently receive a configuration change message 320 indicating a decrease in power availability in the source 102, destination 104, or both. In one instance, adaptor 204 may adjust the bonding configuration to remove the 30 Mbps cable channel and add one or more available communication channels that aggregately consume a less power during communication to effectuate the decreased power availability indicated in the configuration change message 320.

While two examples were provided above, the adaptor 204 may adjust the bonded channel group 112 to adjust one or more capabilities of the bonded channel group 112 according to an identified configuration change. Similarly, the adaptor 204 may adjust the bonded channel group 112 in response to increasing or decreasing performance or metrics characteristic (e.g., channel condition) associated with communication channels within the bonded channel group 112, outside the bonded channel group, or both. As mentioned above, such performance or quality metrics may include changes in SNR, reliability, robustness, link and path cost, or other that warrant adding, removing, or replacing communication channels from the bonded channel group 112. As various communication mediums (e.g., communication channel types) have varying capabilities and performance characteristics, the adaptor 204 may adjust the bonding configuration to include within the bonded channel group 112 selected communication mediums or channel types that most effectively or efficiently communicate the source data.

As an additional or alternative adjustment, the adaptor 204 may modify any number of transmission parameters of a communication channel. The adaptor 204 may increase the bit-rate of a particular communication channel in response to a demand increase, required bandwidth increase, increased throughput, increased power availability, or other configuration changes. The adaptor 204 may also adjust the chunk size of packet groups sent across a communication channel as well.

As a particular transmission parameter adjustment, the adaptor 204 may adjust the bonding configuration by adjusting the transmit power used to communicate across one or more communication channels. For instance, the adaptor may increase the transmit power for one or more modulators or other communication resources in the source 102 upon receiving a configuration change that requests or specifies an increased power availability, increased reliability requirement, increased power request for a particular type of data, data type, communication session, etc., or other changes. The adaptor 204 may reduce transmission power of one or more communication channels in response to converse configuration changes or requests.

As another adjustment, the adaptor 204 may adjust the bonding configuration to send redundant data across multiple communication channels. Doing so may increase the error resiliency and/or reliability of the bonding configuration. For example, the monitor 202 may determine an increased reliability requirement, a decreased reliability a particular communication channel within the bonded channel group 112, or both. The adaptor 204 may further determine that available communication channels are equally or more unreliable than the particular communication channel of the bonded channel group 112, and/or are, alone, incapable of supporting the increased reliability requirement. As such, the adaptor 204 may add one of the available communication channels to the bonded channel group 112 to send redundant data through. In that way, the increase the error resiliency of the bonding configuration by increasing the likelihood that the source data is properly sent through at least one of the multiple communication channels in the bonded channel group 112 sending redundant data.

As a particular adjustment, the adaptor 204 may disable channel bonding—e.g., by removing all communication channels from the bonded channel group 112. The adaptor 204 may determine this adjustment when a configuration change indicates a single communication channel capable can support the communication requirements of the source data.

The adaptor 204 may obtain an adjusted bonding configuration by performing any combination of the exemplary adjustments described above as well as performing any other adjustments to the bonding configuration. The adaptor 204 may also update the bonding configuration parameters 512 to reflect the adjusted bonding configuration and send a configuration communication 126 to the destination indicative of the adjusted bonding configuration. Upon adjusting the bonding configuration, the source 102 (e.g., the distributor 108, modulators 130, etc.) may communicate subsequent source data according to the adjusted bonding configuration.

Figure 6:
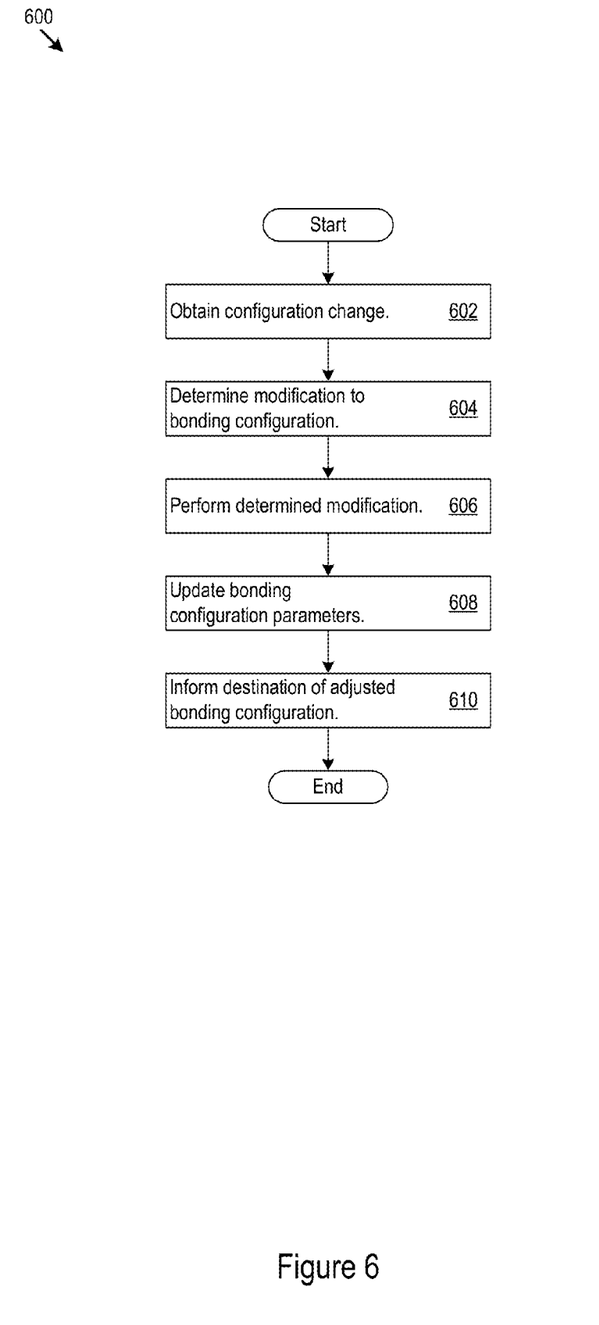
FIG. 6 shows an example of logic for modifying a channel bonding configuration.

FIG. 6 shows an example of logic 600 for modifying a channel bonding configuration. The logic 600 may be implemented as hardware, software, or both. For example, the adaptation logic 504 may implement the logic 600 in software as the adaptation instructions 510.

The adaptation logic 504 may obtain a configuration change (602), which may dictate a change to the bonding configuration. As one example, the adaptation logic 504 may receive a configuration change communication 320 from the monitor 202 specifying an identified characteristic change in the bonding environment. In response, the adaptation logic 504 may determine a modification to the bonding configuration (604), resulting in an adjusted bonding configuration. The adaptation logic 504 may perform the determined modification (606), which may include any of the exemplary adjustments discussed above. Thus, the adaptation logic 504 may perform any combination of modifying the bonded channel group 112, modifying communication parameters of any number of communication resources, such as adjusting transmit power or bit-rate of a particular communication channel, adjust chunk size sent through a communication channel, designate an additional communication channel to redundantly send subsequent source data through, or other modifications. The adaptor 204 may perform the modifications on a per-channel basis, across multiple communication channels in the bonded channel group 112, step-wise, gradually or sequentially over a predetermined period of time, through hysteresis, or in other ways.

The adaptation logic 504 may modify the bonding configuration to adjust an aggregate capability of bonded channel group 112. The adaptation logic 504 may increase the aggregate bandwidth of the bonded channel group 112, decrease the power consumption rate for communicating across the bonded channel group 112, increase the reliability of subsequent source data sent through the bonded channel group 112, or any number of adjustments to an aggregate capability of the bonded channel group 112.

The adaptation logic 504 may update the bonding configuration parameters 512 (608) and inform the destination 104 of the adjusted bonding configuration (610), e.g., through configuration communication 126. The source 102 may then communicate subsequent source data to the destination 104 according to the adjusted bonding configuration.

As described above, the distributor 108 (and more particularly the monitor 202 and adaptor 204) may coordinate to dynamically adjust the bonding configuration employed by the content delivery architecture 100 in response to an identified bonding environment change or configuration change request. As complexities in circumstances and communication characteristics of various communication mediums change over time, the distributor 108 may optimally adjust the configuration to respond to such changes. Thus, a flexible system that may respond to changing conditions and optimally transmit source data from a source 102 to a destination 104.

While the monitor 202 and adaptor 204 were described above with respect to the source 102, the any combination or portion of the monitor 204 and adaptor 204 may be implemented in the destination 104, an intermediate network node, or any other device in the content delivery architecture 100. For example, the monitor 202 and/or the adaptor 204 may be implemented in the destination 104 as part of the collator 118, the TIP 122, or as separate logic. Upon identifying changes to the bonded environment, the destination 104 may adjust a bonding configuration, send a configuration communication 126 to the source 102, or perform any other action to adapt the content delivery architecture 100 in response to the environment change.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A product comprising:
   a machine readable medium other than a transitory signal; and
   instructions stored on the machine readable medium, the instructions, when executed, configured to cause a processor to:
      receive, from a distribution server, a bonding configuration specifying a set of physical channels forming a bonded channel group;
      form the bonded channel group between the distribution server and a destination device, wherein data items of a source transport stream are distributed across the set of physical channels of the bonded channel group;
      monitor a status of: the destination device, a first physical channel, or both;
      send, to the distribution server, a configuration communication indicating the status;
      receive an update to the bonding configuration, the update generated responsive to the configuration communication, the update including an alteration to the bonding configuration that adds the first physical channel to the set of physical channels of the bonded channel group or removes the first physical channel from the set of physical channels of the bonded channel group; and
      re-establish the bonded channel group in accord with the update to the bonding configuration, wherein additional data items of the source transport stream are distributed across the set of physical channels of the re-established bonded channel group.

2. The product of claim 1, where the status comprises a bandwidth availability for the first physical channel.

3. The product of claim 1, where the instructions are further configured to send the configuration communication when the status meets a bonding adaptation criterion.

4. The product of claim 3, where the bonding adaptation criterion comprises a demand threshold, a bandwidth threshold, a channel reliability threshold, a quality of service level, a link cost, a throughput threshold, a power availability threshold, a latency threshold, or any combination thereof.

5. The product of claim 1, where the instructions are configured to monitor the status by performing periodic measurements.

6. The product of claim 1, where the instructions are configured to monitor the status by a performing measurement responsive to an operator request.

7. The product of claim 1, where the instructions are configured to receive a multiplexed stream over the bonded channel group.

8. The product of claim 1, where the instructions are configured to filter packets received over the bonded channel group according to a program identifier.

9. The product of claim 1, where the instructions are configured to monitor the status by receiving another configuration communication from an intermediate node between the distribution server and the destination device.

10. The product of claim 1, where instructions are configured to send the configuration communication responsive to the destination device switching power sources.

11. A device comprising:
communication interface circuitry coupled to multiple physical channels;
a sensor configured to monitor a status of: the device, a first physical channel of the multiple physical channels, or both;
channel bonding circuitry operatively coupled to the sensor and the communication interface circuitry, the channel bonding circuitry configured to:
receive, from a distribution server, a bonding configuration specifying a set of the multiple physical channels forming a bonded channel group;
form the bonded channel group with the distribution server, wherein data items of a source transport stream are distributed across the set of physical channels of the bonded channel group;
receive an indication of the status from the sensor;
send, to the distribution server, a configuration communication indicating the status;
receive an update to the bonding configuration, the update generated responsive to the configuration communication; and
reform the bonded channel group in accord with the update by adding the first physical channel to the set of the multiple physical channels or removing the first physical channel from the set of physical channels.

12. The device of claim 11, where the sensor is configured to monitor the status by performing periodic measurements.

13. The device of claim 11, where the channel bonding circuitry is configured to cause the sensor to monitor the status by a performing measurement responsive to an operator request.

14. The device of claim 11, where the communication interface is configured to receive a multiplexed stream over the bonded channel group.

15. The device of claim 11, where the channel bonding circuitry is configured to filter packets received over the bonded channel group according to a program identifier.

16. A method comprising:
receiving, from a distribution server, a bonding configuration specifying a set of physical channels forming a bonded channel group;
forming the bonded channel group between the distribution server and a destination device;
monitoring a status of: the destination device, a first physical channel, or both;
sending, to the distribution server, a configuration communication indicating the status;
receiving an update to the bonding configuration; and
reform the bonded channel group in accord with the update to add the first physical channel to the set of physical channels or remove the first physical channel from the set of physical channels.

17. The method of claim 16, where:
the method further comprises switching a power source of the destination device; and
sending the configuration communication comprises sending the configuration communication responsive to switching the power source.

18. The method of claim 16, where sending the configuration communication comprises sending the configuration communication responsive to a bonding adaptation criterion.

19. The method of claim 18, where the bonding adaptation criterion comprises a demand threshold, a bandwidth threshold, a channel reliability threshold, a quality of service level, a link cost, a throughput threshold, a power availability threshold, a latency threshold, or any combination thereof.

20. The method of claim 16, where:
monitoring a status of the first physical channel comprises detecting a link failure on the first physical channel.

* * * * *